(No Model.)

H. G. M. HOWARD.
VEHICLE WHEEL.

No. 465,476. Patented Dec. 22, 1891.

Witnesses:
Walter S. Wood
Marian Longyear

Inventor.
Henry G. M. Howard
By Lucius C. West
Att'y.

UNITED STATES PATENT OFFICE.

HENRY G. M. HOWARD, OF KALAMAZOO, MICHIGAN.

VEHICLE-WHEEL.

SPECIFICATION forming part of Letters Patent No. 465,476, dated December 22, 1891.

Application filed March 14, 1891. Serial No. 385,013. (No model.)

*To all whom it may concern:*

Be it known that I, HENRY G. M. HOWARD, a citizen of the United States, residing at Kalamazoo, county of Kalamazoo, State of Michigan, have invented a new and useful Vehicle-Wheel, of which the following is a specification.

This invention has for its object the below described and claimed construction of a wheel, whereby, in view of the peculiar construction of the spokes of the wheel, the shock upon the felly of the wheel is cushioned and the construction lasts longer and the occupants of the vehicle do not experience the uncomfortable jogging as in ordinary vehicles.

Figure 1:
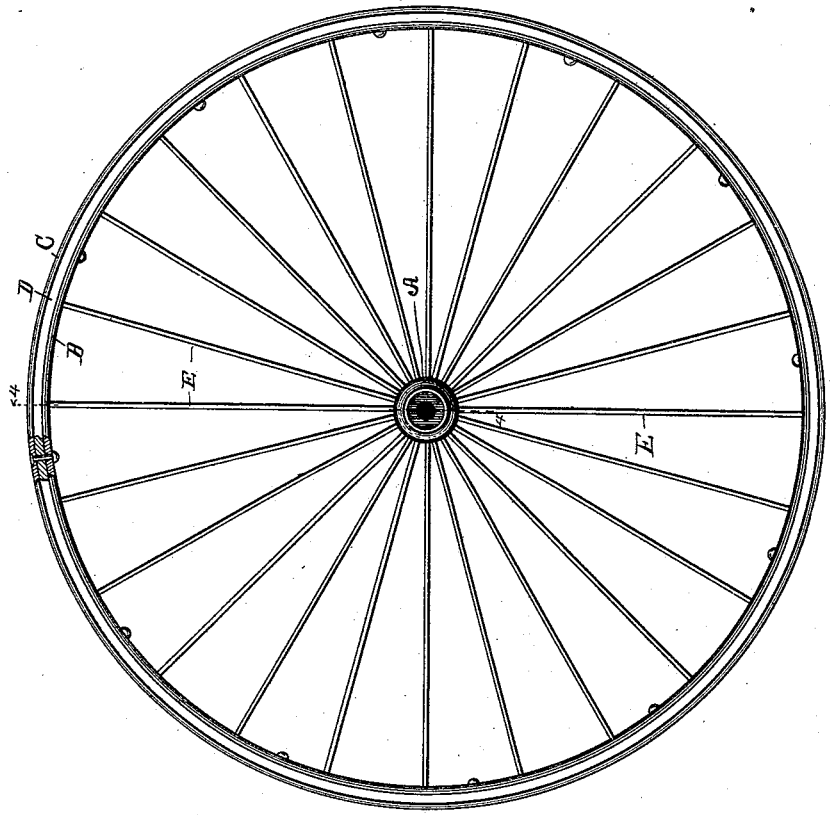
Figure 2:
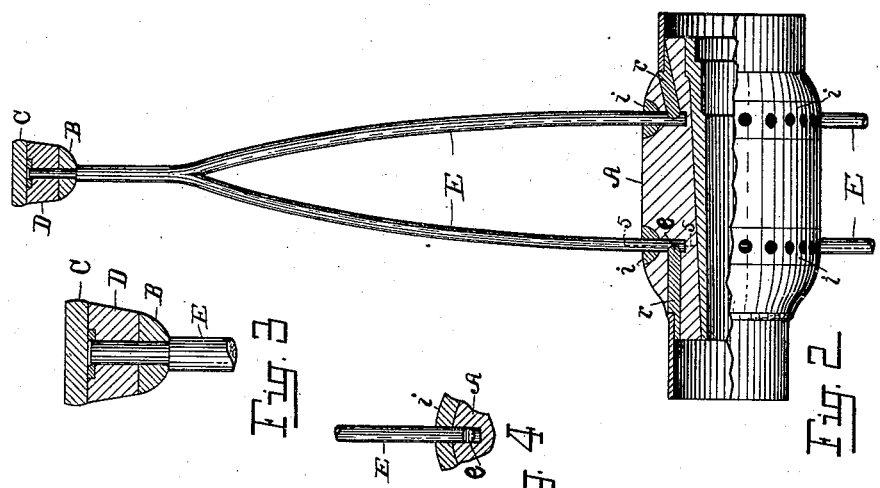
Figure 3:
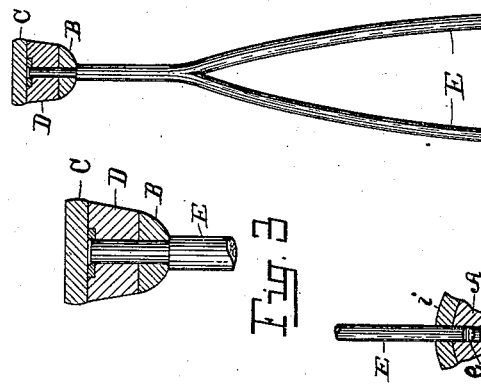
Figure 4:
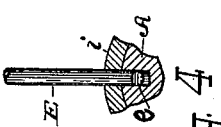

In the drawings forming a part of this specification, Figure 1 is a side elevation of one of the wheels. Fig. 2 is an enlarged section on line 4 4 in Fig. 1. Fig. 3 is enlarged details of lettered parts in Fig. 2, and Fig. 4 is a section on line 5 5 in Fig. 2.

Referring to lettered parts of the drawings, E represents the forked spokes of the wheel, the forked members of which bulge laterally from each other, the free ends thereof being attached to the hub and the opposite end being attached to the felly. The advantages obtained by these spokes of the wheel being constructed in this manner are cheapness of construction, attractive appearance, and a more especial advantage is derived from the fact that the shock which the felly of the wheel receives is cushioned. This shock is cushioned because the forked members of the spoke E are bowed outward from each other laterally, and for that reason when the wheel comes in contact with an obstruction—as, for instance, passing over a rail of a railway or any like obstruction—the forked members of the spokes will receive the shock and spring outward, and the occupants of the vehicle will not experience any inconvenience on account of any jar that would have otherwise occurred by a vehicle traveling over such obstructions if the wheels of the vehicle were constructed upon the ordinary plan in which the members of the forked part of the spoke do not bow directly outward and from each other. The upper end of this spoke E is made as an integral whole for a short distance below the felly and from thence extends to the hub in the separated members, which, as shown, bow outward their entire length directly from each other.

A hub A is pivoted with two bands $i$, shrunk thereon. The ends of the forked members of the spoke are inserted into the hub through these bands. At $r$ $r$ oblique holes extend from the outer surface of the hub into the holes occupied by the ends of the spokes, said ends of the spokes being provided with notches $e$, as in Figs. 2 and 4. These holes $r$ $r$ are filled with molten metal, which runs into said notches, and when cool locks the spokes in the hub.

The rim of the wheel is composed of an inner metal ring B, and metal tire C, and a wooden ring D between the tire and the metal ring.

The felly is attached to the outer tenoned ends of the spokes E by being inserted through the metal ring B and wooden ring D and attached by countersunk members in the periphery of the wooden ring, as clearly shown in Figs. 2 and 3. The rings B and E are thus firmly attached to these elastic spokes independent of the tire C. The spokes might extend through the tire in some instances, but this is not desirable in connection with the spokes having the bowed parts which will yield more or less in accordance with how tight the tire is shrunk on the wheel. The preferable way to attach the tire is by bolting it to the felly, as in Fig. 1.

Having thus described my invention, what I claim as new, and desire to secure by Letters Patent of the United States, is—

1. A wheel comprising a felly, a hub, and spokes formed as an integral whole for a short distance from the felly, thence extending in separate elastic members entirely to the hub, which separated elastic members bow outwardly from each other, substantially as set forth.

2. The combination of a wheel-rim, spokes formed as an integral whole a short distance from said rim, from thence separating into members which bow outwardly from each other, the free ends of said members being provided with the notches, a hub having the spoke-holes and the oblique holes leading thereinto, and metal filling the latter-named holes and engaging the notches of the spokes, substantially as set forth.

3. The combination of the hub, spokes formed as an integral whole a short distance from the wheel-rim, from thence separating into members bowing outwardly from each other, the outer ends of said spokes being tenoned, and the wheel-rim comprising an inner metal ring, an outer metal tire, and an intermediate wooden ring, the tenoned ends of said spokes being riveted over and countersunk in the periphery of the wooden ring, substantially as set forth.

In testimony of the foregoing I have hereunto subscribed my name in the presence of two witnesses.

HENRY G. M. HOWARD.

Witnesses:
H. RICHARDSON,
ELI STRONG.